US010122727B2

(12) United States Patent
Johansson et al.

(10) Patent No.: US 10,122,727 B2
(45) Date of Patent: *Nov. 6, 2018

(54) SOCIAL NETWORKING BEHAVIOR-BASED IDENTITY SYSTEM

(71) Applicant: Amazon Technologies, Inc., Seattle, WA (US)

(72) Inventors: Jesper Mikael Johansson, Redmond, WA (US); George Nikolaos Stathakopoulos, Seattle, WA (US); Darren Ernest Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,881

(22) Filed: Oct. 14, 2015

(65) Prior Publication Data

US 2016/0072824 A1    Mar. 10, 2016

Related U.S. Application Data

(63) Continuation of application No. 13/711,259, filed on Dec. 11, 2012, now Pat. No. 9,166,961.

(51) Int. Cl.
  *G06F 7/04* (2006.01)
  *H04L 29/06* (2006.01)
  *G06F 21/62* (2013.01)
  *G06F 15/16* (2006.01)

(52) U.S. Cl.
  CPC ........ *H04L 63/102* (2013.01); *G06F 21/6245* (2013.01); *H04L 63/08* (2013.01); *H04L 63/10* (2013.01)

(58) Field of Classification Search
  CPC .......... H04L 29/08378; H04L 67/1057; H04L 63/102; H04L 63/107; G06Q 50/01
  USPC ......................................... 726/4, 6, 7, 28, 29
  See application file for complete search history.

(56) References Cited

U.S. PATENT DOCUMENTS

| 6,496,936 | B1 | 12/2002 | French et al. |
| 7,117,528 | B1 | 10/2006 | Hyman et al. |
| 7,853,984 | B2 | 12/2010 | Antell et al. |
| 8,191,164 | B2 | 5/2012 | Pepin et al. |
| 8,478,662 | B1 * | 7/2013 | Snodgrass ............... G06Q 30/02 705/26.1 |
| 8,620,942 | B1 * | 12/2013 | Hoffman .............. G06Q 10/107 707/766 |
| 8,621,215 | B1 * | 12/2013 | Iyer ........................ G06Q 20/10 713/169 |

(Continued)

*Primary Examiner* — Gary S Gracia
(74) *Attorney, Agent, or Firm* — Thomas | Horstemeyer, LLP

(57) ABSTRACT

Disclosed are various embodiments for a social networking behavior-based identity system that employs social networking data that a user has elected to share through an opt-in procedure. First social networking data is stored in association with a user identity. An assertion of the user identity is received from a client after the first social networking data is stored. Second social networking data is received in response to receiving the assertion of the user identity. An identity confidence level as to whether the user identity belongs to a user at the client is generated based at least in part on a comparison of the second social networking data with the first social networking data.

20 Claims, 5 Drawing Sheets

(56) References Cited

U.S. PATENT DOCUMENTS

| | | | |
|---|---|---|---|
| 8,819,851 B1* | 8/2014 | Johansson | H04L 63/0428 726/28 |
| 9,053,307 B1 | 6/2015 | Johansson et al. | |
| 9,166,961 B1* | 10/2015 | Johansson | H04L 63/08 |
| 9,424,612 B1* | 8/2016 | Bright | G06F 17/30867 |
| 2002/0188854 A1 | 12/2002 | Heaven et al. | |
| 2004/0083394 A1 | 4/2004 | Brebner et al. | |
| 2006/0248573 A1* | 11/2006 | Pannu | G06F 21/62 726/1 |
| 2007/0124290 A1 | 5/2007 | Swanson et al. | |
| 2008/0148366 A1 | 6/2008 | Wahl | |
| 2009/0049544 A1 | 2/2009 | Kashi | |
| 2009/0156160 A1* | 6/2009 | Evans | G06Q 50/01 455/404.2 |
| 2009/0164574 A1* | 6/2009 | Hoffman | H04W 4/02 709/204 |
| 2009/0199264 A1 | 8/2009 | Lang | |
| 2009/0228486 A1* | 9/2009 | Kuehr-McLaren | G06F 17/3089 |
| 2009/0260075 A1 | 10/2009 | Gedge et al. | |
| 2009/0328205 A1* | 12/2009 | Ims | G06F 21/6245 726/22 |
| 2010/0036783 A1 | 2/2010 | Rodriguez | |
| 2010/0042680 A1 | 2/2010 | Cqyzewicz et al. | |
| 2010/0082354 A1* | 4/2010 | Sundaresan | G06Q 30/02 705/1.1 |
| 2010/0115610 A1 | 5/2010 | Tredoux et al. | |
| 2010/0122329 A1 | 5/2010 | Jokobsson et al. | |
| 2010/0125505 A1 | 5/2010 | Puttaswamy | |
| 2010/0131835 A1 | 5/2010 | Kumar et al. | |
| 2010/0274597 A1 | 10/2010 | Dill | |
| 2011/0022477 A1 | 1/2011 | Hatridge et al. | |
| 2011/0055132 A1 | 3/2011 | Mandian et al. | |
| 2011/0055249 A1 | 3/2011 | Consuegra et al. | |
| 2011/0078190 A1* | 3/2011 | Samuel | G06Q 10/06 707/780 |
| 2011/0112957 A1 | 5/2011 | Ingram et al. | |
| 2011/0113149 A1* | 5/2011 | Kaal | H04L 67/104 709/231 |
| 2011/0167440 A1* | 7/2011 | Greenfield | H04L 63/102 725/25 |
| 2011/0225644 A1 | 9/2011 | Pullikottil et al. | |
| 2012/0042392 A1* | 2/2012 | Wu | H04L 63/101 726/28 |
| 2012/0047147 A1* | 2/2012 | Redstone | G06F 17/3087 707/748 |
| 2012/0079576 A1 | 3/2012 | Han et al. | |
| 2012/0089617 A1* | 4/2012 | Frey | G06F 17/30867 707/748 |
| 2012/0137340 A1 | 5/2012 | Jakobsson et al. | |
| 2012/0158935 A1* | 6/2012 | Kishimoto | G06Q 10/10 709/223 |
| 2012/0198348 A1* | 8/2012 | Park | G06F 3/0488 715/739 |
| 2012/0198491 A1 | 8/2012 | O'Connell et al. | |
| 2012/0209904 A1 | 8/2012 | Huang | |
| 2012/0209970 A1* | 8/2012 | Scipioni | G06Q 30/06 709/223 |
| 2012/0226749 A1 | 9/2012 | Dale et al. | |
| 2012/0246720 A1 | 9/2012 | Xie et al. | |
| 2012/0291137 A1 | 11/2012 | Walsh et al. | |
| 2013/0013489 A1* | 1/2013 | Kremen | G06Q 40/025 705/38 |
| 2013/0024693 A1 | 1/2013 | Chiou et al. | |
| 2013/0031176 A1 | 1/2013 | Shih et al. | |
| 2013/0036459 A1 | 2/2013 | Liberman et al. | |
| 2013/0054433 A1 | 2/2013 | Giard et al. | |
| 2013/0086185 A1 | 4/2013 | Desmarais et al. | |
| 2013/0091540 A1 | 4/2013 | Chen et al. | |
| 2013/0091582 A1 | 4/2013 | Chen et al. | |
| 2013/0097184 A1 | 4/2013 | Berkhin et al. | |
| 2013/0097673 A1 | 4/2013 | Meehan et al. | |
| 2013/0124641 A1 | 5/2013 | Ryabchun et al. | |
| 2013/0167207 A1 | 6/2013 | Davis et al. | |
| 2013/0198811 A1* | 8/2013 | Yu | H04L 63/104 726/4 |
| 2013/0262131 A1 | 10/2013 | Lewis | |
| 2014/0013107 A1 | 1/2014 | Clair | |
| 2014/0019539 A1 | 1/2014 | Novak et al. | |
| 2014/0137223 A1 | 5/2014 | Wagner et al. | |
| 2014/0165140 A1 | 6/2014 | Singla et al. | |
| 2015/0081800 A1* | 3/2015 | Bills | G06Q 10/107 709/206 |

* cited by examiner

SOCIAL NETWORKING BEHAVIOR-BASED IDENTITY SYSTEM

CROSS-REFERENCE TO RELATED APPLICATIONS

This application is a continuation of, and claims priority to, co-pending U.S. patent application entitled "SOCIAL NETWORKING BEHAVIOR-BASED IDENTITY SYSTEM," filed on Dec. 11, 2012, and assigned application Ser. No. 13/711,259, which is incorporated herein by reference in its entirety.

BACKGROUND

Identity determination is often an important process for network sites. Network sites may make a determination of user identity before granting a user access to secured data or customizing content based on user preferences. Users typically verify their identity for network sites by providing a correct username and password combination.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a social networking behavior-based identity system. Typical systems of identity determination and authentication are configured to associate accounts with email addresses. The ability to receive email at a specified email address may be a prerequisite for a user to create an account or to reset or change a password for an existing account. However, email providers may close email accounts due to inactivity or an explicit request. After a predefined time period elapses, the email address of a first user may be released for registration by a second user. The second user may then attempt to gain access to other accounts of the first user that are associated with the particular email address.

Accordingly, factors other than the ability to receive email at the specified email address may be used to confirm user identity. To this end, various embodiments of the present disclosure employ social networking behavior as a factor in user identity determination and authentication. For example, a user may link a particular account with social networking data describing a circle of friends. At some time later, the particular account may be deemed inactive and/or the user may request to reset the password to the particular account. The user may be requested to provide access to social networking data in order to authenticate to the particular account. An identity confirmation factor may involve comparing the new circle of friends with the previously linked circle of friends. In the following discussion, a general description of the system and its components is provided, followed by a discussion of the operation of the same.

Figure 1:
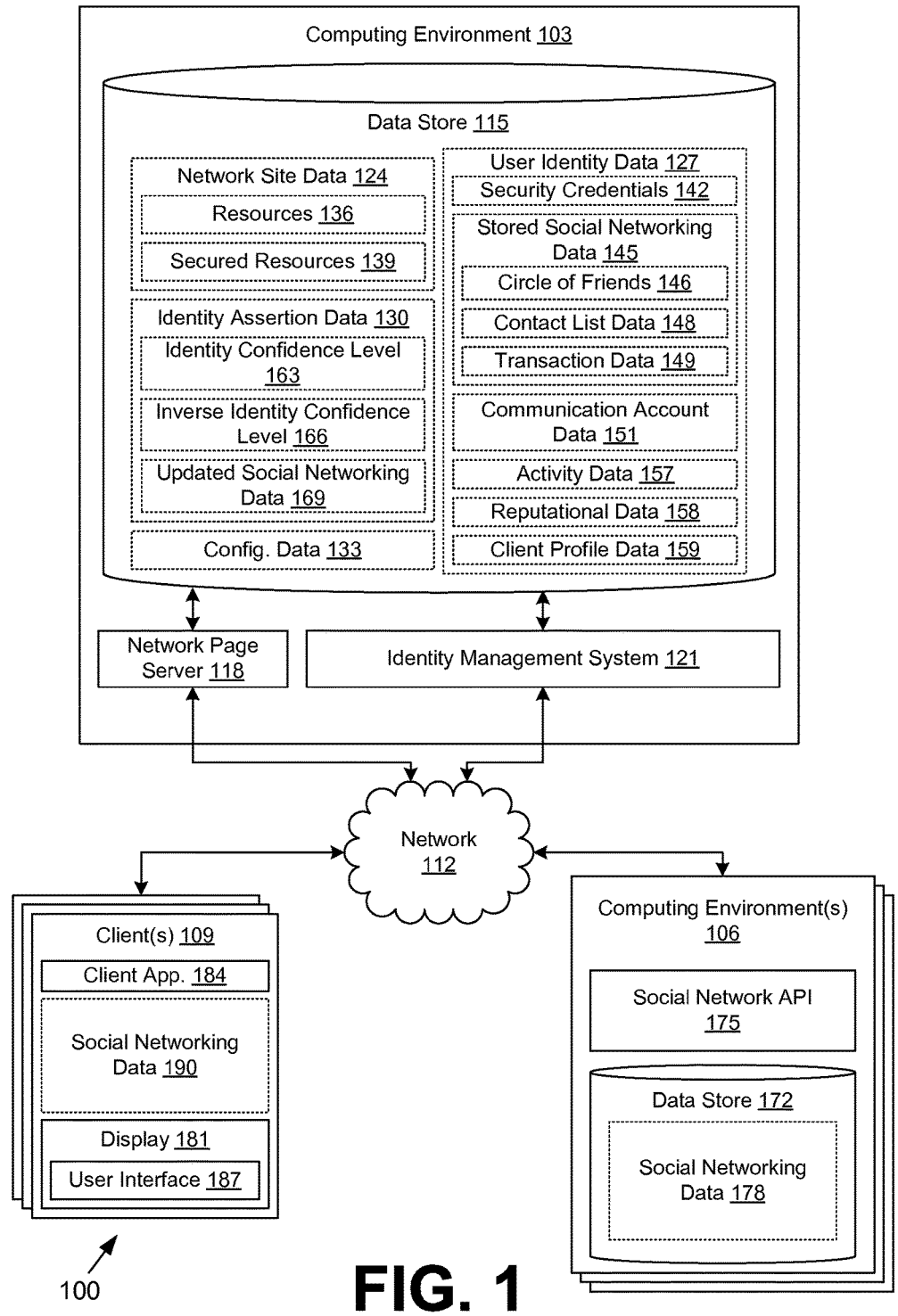
FIG. 1 is a drawing of a networked environment according to various embodiments of the present disclosure.

With reference to FIG. 1, shown is a networked environment 100 according to various embodiments. The networked environment 100 includes a computing environment 103, a computing environment 106, and a client 109 in data communication via a network 112. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, computing environment 103 may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a network page server 118, an identity management system 121, and other applications, services, processes, systems, engines, or functionality not discussed in detail herein. The network page server 118 is executed to serve up various network resources of a network site. Such resources may include network page data, mobile application data, and/or other network resources. In various scenarios, the network site may correspond to an electronic commerce site that facilitates online ordering of items from one or more online merchants. In one embodiment, the network page server 118 may correspond to a commercially available hypertext transfer protocol (HTTP) server such as Apache® HTTP Server, Apache® Tomcat®, Microsoft® Internet Information Services (IIS), and/or other servers.

The identity management system 121 is executed to provide user identity recognition and authentication functionality for the network site. The identity management system 121 may provide social networking behavior-based identity recognition and authentication in place of, or in addition to, the use of traditional security credentials such as, for example, usernames and passwords, biometric systems, authentication based on possession of a physical token, and so on. In some cases, social networking behavior may be employed as a factor for authentication under special circumstances where the identity management system 121 may have good cause to doubt that the user identity belongs to the client 109, e.g., during password reset requests, when incorrect security credentials are provided, when the user identity has been inactive for a predefined period of inactivity, and so on.

The data stored in the data store 115 includes, for example, network site data 124, user identity data 127, identity assertion data 130, identity system configuration data 133, and potentially other data. The network site data 124 includes various data served up by the network page server 118 or used by the network page server 118 or other services in generating resource data that is served up by the network page server 118 for a network site. Such network site data 124 may include, for example, text, code, images, video, audio, and/or other data.

The network site data 124 may be structured into resources 136 which are unsecured, secured resources 139 that may be associated with user identities, and/or other categories. For example, the resources 136 may be accessed by unrecognized or unauthenticated users, while the secured resources 139 may be accessed by users who have been recognized or authenticated. In some embodiments, the secured resources 139 may be divided into multiple categories, where one or more categories employ social networking behavior-based authentication, while one or more other categories do not. In some cases, a greater identity confidence may be demanded before certain categories of secured resources may be accessed.

The user identity data 127 includes various data associated with user identities and/or user accounts that have been shared by the users. As described herein, the user identity data 127 may correspond to data that the user has elected to share with the identity management system 121. In other words, the user identity data 127 may be maintained on a strictly opt-in basis. Further, anonymization of identifiers and other measures to disassociate personally identifiable information may be employed to safeguard user privacy and adhere to privacy policies.

In various embodiments, a user identity need not correspond to real data for a person. To the contrary, the user identity data 127 may be associated with fictitious information that is provided by the user consistently. In some cases, a user identity in the user identity data 127 may correspond to multiple people each having subaccounts with different behavioral characteristics. The user identity data 127 may include security credentials 142; stored social networking data 145 that may include a circle of friends 146, contact list data 148, and transaction data 149; communication account data 151; activity data 157; reputational data 158; client profile data 159; and/or other data. The user identity data 127 may also include various account data for the user, including name, address, preferences, personalizations, customer reviews of items, order history, browse history, and so on.

The security credentials 142 may include usernames, passwords, asymmetric cryptographic keys, cookie identifiers, and/or other information that may be employed for authentication that relates to data that a user has or knows rather than how the user behaves. The stored social networking data 145 may comprise trusted social networking data that is associated with the user identity. In some embodiments, the stored social networking data 145 may include a circle of friends 146. The circle of friends 146 may correspond to symmetric or asymmetric relationships between the user identity and other user identities participating in a social network such as, for example, Facebook®, LinkedIn®, MySpace®, Friendster®, and others. A symmetric relationship in a circle of friends 146 may correspond to a relationship between two parties where both parties have explicitly consented to the relationship. By contrast, an asymmetric relationship in a circle of friends 146 may correspond to a relationship between two parties where only one party has explicitly consented to the relationship.

In some cases, the stored social networking data 145 may be derived implicitly through contact list data 148, transaction data 149, and/or other data. The contact list data 148 may describe a list of contacts associated with the user identity. The contact list data 148 may be pulled from an address book stored on or associated with the client 109, downloaded from an email account or other account that reflects communication between the user associated with the user identity and other users, or obtained from other sources.

The transaction data 149 may correspond to transactions with merchants, geolocation data, and other behavioral data and may be employed to infer social networking connections between user identities. The transaction data 149 may be analyzed to generate a list of at least one location visited by a person corresponding to the user identity. As a non-limiting example, a user who, from his or her transactions (e.g., airplane tickets, on-site transactions, geolocation data, etc.), appears to visit a certain city or other geographic region away from home yet does not rent a car and does not stay in a hotel may have a social relationship with one or more people in that certain city or other geographic region. As another non-limiting example, a user who ships items to other addresses may have a social relationship with one or more people at the other addresses. Further, a social relationship may be more strongly inferred, for example, if the items being sent are gift wrapped.

The communication account data 151 may describe an email account, telephone number, or other communication account that may be employed to provide a form of proof of identity. For example, such communication accounts may be employed to reset a security credential 142, recover a lost security credential 142, or perform other actions to recover access to a user identity. To reset a security credential 142, a special reset token may be sent in an email to an email address, in a text message to a telephone number, etc. Upon providing the reset token, e.g., by manual entry in a form through the network page server 118, by accessing a special uniform resource locator (URL) that encodes the reset token, and so on, a form of proof of identity may be provided. However, it is noted that the email address, telephone number, etc. may be reassigned to another user, making this form of authentication potentially fallible.

The activity data 157 may be employed to track the activity and/or inactivity of a user identity. A user identity may be deemed inactive if the user identity has not been employed for a predefined period of time. As a non-limiting example, a user identity may be determined to be inactive if the user has not authenticated to the user identity for one year, eighteen months, or some other time period. The time period ideally will be selected to account for seasonal logins, e.g., some customers may log in only once a year in December. In some cases, the user identity may be reassigned to another user, with a new corresponding user account being created, when the user identity is inactive, or after another predefined period of time. Such reassignment may be desirable when a namespace for the user identity is relatively limited, e.g., usernames for a particular email domain, telephone numbers within a congested area code, and so on.

The reputational data 158 corresponds to a reputation of the particular user identity. User identities may have a greater or lesser reputation depending on a paid subscription or membership status of the user identity, login frequency, longevity of the account, orders placed, whether other users have endorsed the user identity, item reviews authored, ratings of the item reviews, a country or region associated with the user identities, and so on. As a non-limiting example, a user identity established five years ago that has been consistently active every month and is associated with dozens of customer product reviews which have been rated helpful will be considered to have a greater reputation than a user identity established two months ago that has been inactive for a month and is not associated with any customer product reviews. As another non-limiting example, a user identity associated with a paid subscription, membership, or other status enhanced by way of a periodic payment may be considered more reputable than a user identity that does not have the same paid subscription or status. The reputational data 158 may also track poor reputation, such as whether the user identity corresponds to a known fraudster. User identities based in geographic regions associated with high levels of fraud may have relatively lower reputations.

The client profile data 159 may correspond to a stored client profile associated with the user identity. For example, the client profile data 159 may include data relating to network addresses, cookie identifiers, and/or other characteristics of clients 109 associated with the user identity. The identity assertion data 130 corresponds to data associated with a client 109 which may be unrecognized or unauthenticated as having a user identity. The identity assertion data 130 may include an identity confidence level 163, an inverse identity confidence level 166, updated social networking data 169, and/or other data. The identity confidence level 163 is a score computed by the identity management system 121 corresponding to a confidence that a particular user identity belongs to a user at the client 109. The inverse identity confidence level 166 is a score computed by the identity management system 121 corresponding to a confidence that a user at the client 109 does not have a particular user identity (i.e., that the particular user identity does not belong to the user at the client 109).

The updated social networking data 169 corresponds to social networking data received in connection with a client 109 presenting an assertion of a user identity. For example, the client 109 may be requested to provide information regarding a social networking account to facilitate social networking behavior-based authentication. The identity management system 121 may compare the updated social networking data 169 with the stored social networking data 145 as part of the authentication process.

The configuration data 133 includes various configuration parameters that control the operation of the identity management system 121. Such parameters may relate to authentication and recognition thresholds, thresholds regarding overlap of circles of friends 146, thresholds regarding reputation of friends that may affect authentication and/or recognition, and so on.

The computing environment 106 may comprise, for example, a server computer or any other system providing computing capability. Alternatively, a plurality of computing devices may be employed that are arranged, for example, in one or more server banks or computer banks or other arrangements. For example, computing environment 106 may comprise a cloud computing resource, a grid computing resource, and/or any other distributed computing arrangement. Such computing devices may be located in a single installation or may be distributed among many different geographical locations. The computing environment 106 may be operated by a different entity from the entity that operates the computing environment 103. Multiple different computing environments 106 may be provided in the networked environment 100. Such multiple computing environments 106 may each correspond to different entities and different network sites.

Various applications and/or other functionality may be executed in the computing environment 106 according to various embodiments. Also, various data is stored in a data store 172 that is accessible to the computing environment 106. The data store 172 may be representative of a plurality of data stores 172 as can be appreciated. The data stored in the data store 172, for example, is associated with the operation of the various applications and/or functional entities described below.

The components executed on the computing environment 106, for example, include a social network application programming interface (API) 175, and other applications, services, processes, systems, engines, or functionality not discussed in detail herein. The social network API 175 is configured to provide social networking data to the identity management system 121 about a particular user in response to a request. The data stored in the data store 172 includes, for example, social networking data 178 and potentially other data. Such social networking data 178 may include, for example, names and/or other identifying information regarding the circle of friends 146 associated with the user, notifications that a particular user has added another user to his or her circle of friends 146, notifications that a particular user has accepted an invitation to join the circle of friends 146 of another user, endorsements of a particular user by other users, and so on.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 181. The display 181 may comprise, for example, one or more devices such as liquid crystal display (LCD) screens, gas plasma-based flat panel displays, LCD projectors, or other types of display devices, etc.

The client 109 may be configured to execute various applications such as a client application 184 and/or other applications. The client application 184 may correspond to a browser, mobile application, or other application configured to access and render network content, such as network pages or mobile application data, obtained from the network page server 118 or other servers. The client application 184 may be configured to render a user interface 187 on the display 181. The client application 184 may be configured to store social networking data 190 including, for example, data regarding circles of friends 146, contact lists, email and telephone correspondence records, and so on. The client application 184 may be configured to provide at least a portion of the social networking data 190 stored in the client 109 to the identity management system 121 to facilitate identity recognition and authentication. The client 109 may be configured to execute applications beyond the client application 184 such as, for example, mobile applications, email applications, instant message applications, social networking applications, and/or other applications.

Next, a general description of the operation of the various components of the networked environment 100 is provided. To begin, a user establishes a user identity with the identity management system 121. To this end, the user may complete an enrollment process, for example, using a form in a mobile application or in a network page. In some cases, the user may call an agent of the identity management system 121, and the agent may perform the data entry. The user may provide a name, contact information, birthdate, mailing addresses, payment instruments, answers to security questions, an email address or telephone number used to reset a security credential, security credentials such as usernames and passwords, and other information. Accordingly, the security credentials 142 and the communication account data 151 may be populated. The user may also provide social network-related information, such as an identification of a social networking account, information and security credentials needed to access information regarding the social networking account, a list of contacts, information and security credentials needed to access the list of contacts, and so on.

Thus, the identity management system 121 is able to access and store the stored social networking data 145, the contact list data 148, and/or other data that may be populated from external sources. In one scenario, the identity management system 121 may communicate with the client 109 to access the social networking data 190 stored by the client 109. In another scenario, the identity management system 121 may communicate with the social network API 175 executed by the computing environment 106 in order to obtain the social networking data 178 stored by the data store 172. In another scenario, the identity management system 121 may communicate with another external computing environment 106 to obtain information regarding contacts from an email account or other communication account of the user.

Over time, the transaction data 149 and the reputational data 158 for the user identity may be populated as the user engages in various transactions (e.g., places orders, etc.) and builds a community reputation (e.g., writes reviews of products, etc.). The activity data 157 may be updated based at least in part on the inactivity or activity of the user, such as a time associated with the last successful log in of the user identity to access resources 136 or secured resources 139.

In various situations, the identity management system 121 may employ social networking data to facilitate identity recognition and/or authentication. The identity confidence level 163 and/or the inverse identity confidence level 166 may be employed to facilitate multiple factor behavior-based authentication. Various techniques for a behavior-based identity system are described by U.S. patent application Ser. No. 13/555,724 entitled "BEHAVIOR-BASED IDENTITY SYSTEM" and filed on Jul. 23, 2012, which is incorporated herein by reference in its entirety.

Various circumstances and actions by the user at the client 109 may cause a relatively lower identity confidence level 163 and/or a relatively higher inverse identity confidence level 166. For example, the client 109 may provide an incorrect security credential 142, the user identity may have shown no activity for a certain predefined time period, the client 109 may request reset of a security credential 142, an unrecognized client 109 may be employed, and so on. In response to such circumstances and actions, social networking behavior may be employed as a factor for identity recognition and/or authentication. In some cases, social networking behavior may be employed as an additional factor for authentication even when a correct security credential 142 has been supplied.

Figure 2:
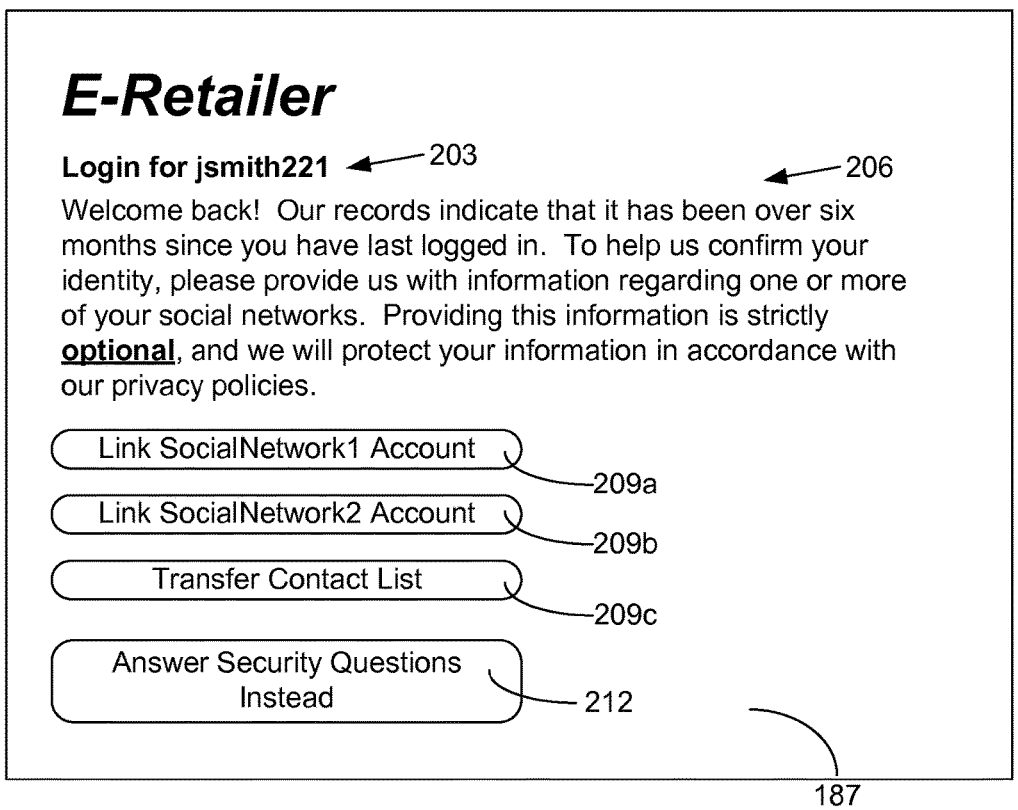
FIG. 2 is a drawing of an example of a user interface rendered by a client in the networked environment of FIG. 1 according to various embodiments of the present disclosure.

Referring next to FIG. 2, shown is one example of a user interface 187 rendered by a client 109 (FIG. 1) in the networked environment 100 (FIG. 1). The user interface 187 provides one example of a network page or mobile application screen that is configured to solicit updated social networking data 169 (FIG. 1) from a user at the client 109. Assuming that authentication is not otherwise successful (i.e., the identity confidence level 163 (FIG. 1) may be below a minimum threshold or the inverse identity confidence level 166 (FIG. 1) may be above a maximum threshold), the user may be prompted for other information to facilitate authentication. This other information may comprise social networking information.

As shown in FIG. 2, the user has provided an assertion of a user identity corresponding to a username 203 of "jsmith221." An explanatory message 206 states that the activity data 157 (FIG. 1) indicates that the user identity has not been logged in within a certain time period, here 6 months. The explanatory message 206 requests that the user provide information regarding social networks of the user to facilitate authentication. One or more options 209 may be present for the user to provide the social network information. For example, option 209a allows the user to link an account with "SocialNetwork1," option 209b allows the user to link an account with "SocialNetwork2," and option 209c allows the user to transfer a contact list.

Providing social networking information may be optional for the user. Accordingly, an alternative option 212 may be provided so that the user may provide information other than social networking information. For example, the alternative option 212 may allow the user to answer various security questions, such as knowledge-based questions, in lieu of providing social networking information. Correct answers to the security questions may cause the identity confidence level 163 to increase and the inverse identity confidence level 166 to decrease.

Returning now to FIG. 1, if the user elects to share social networking information to support an assertion of the user identity, the identity management system 121 can then communicate with the social network API 175 or other services to obtain information. The identity management system 121 may also obtain social networking data 190 from the client 109. Accordingly, the updated social networking data 169 associated with the assertion of the user identity is generated.

The identity management system 121 may then proceed to compare the updated social networking data 169 with the stored social networking data 145 associated with the user identity. For example, both the updated social networking data 169 with the stored social networking data 145 may be associated with a respective circle of friends 146, and the identity management system 121 may compare the respective circles of friends 146 to determine a degree of overlap. If the degree of overlap meets a certain threshold for similarity, the degree of overlap may count positively towards authentication for the identity confidence level 163 and/or the inverse identity confidence level 166.

As a non-limiting example, suppose that the stored social networking data 145 is generated from contact list data 148 imported from an email account of the user. In asserting a user identity, the user may link a social networking account. The social networking data 178 for the account may be obtained from the social network API 175. The identity management system 121 may determine that 60% of the email contacts are also friends within a circle of friends 146 in the social network. Based on this relatively large degree of overlap, the identity confidence level 163 may be increased and/or the inverse identity confidence level 166 may be decreased. It is noted that such an increase and/or decrease may correspond to a fixed amount in response to the degree of overlap meeting a threshold or a variable amount correlated to the degree of overlap.

As a non-limiting example, suppose that the stored social networking data 145 is generated from transaction data 149 that includes a list of locations visited by a person corresponding to the user identity. Such locations may correspond to locations where the user has not rented a car or lodging. In asserting a user identity, the user may link a social networking account. The social networking data 178 for the account may be obtained from the social network API 175. The identity management system 121 may determine that 12 members of the circle of friends 146 in the social network live in locations that have been visited by the person corresponding to the user identity. Based on this comparison, the identity confidence level 163 may be increased and/or the inverse identity confidence level 166 may be decreased.

As another non-limiting example, suppose that the stored social networking data 145 is imported from a first social network API 175 for a first social networking account. In asserting a user identity, the user may link a second social networking account. The social networking data 178 for this second account may be obtained from a second social network API 175. The identity management system 121 may determine that 1% of the first circle of friends 146 overlaps with the second circle of friends 146. Based on this relatively small degree of overlap, the identity confidence level 163 may be decreased and/or the inverse identity confidence level 166 may be increased. It is noted that such a decrease and/or increase may correspond to a fixed amount in response to the degree of overlap meeting a threshold or a variable amount correlated to the degree of overlap.

Additionally, the identity management system 121 may be configured to determine whether a single payment instrument (e.g., a gift card) was used to pay for a shipment to at least one member of a stored circle of friends 146 and to at least one member of an updated circle of friends 146. If the same payment instrument was used, the identity confidence level 163 may be increased. Likewise, if email communications, telephone calls, etc. indicate that the user employed the same email address, telephone number, etc. to contact at least one member of a stored circle of friends 146 and at least one member of an updated circle of friends 146, the identity confidence level 163 may be increased. Whether such data is available to the identity management system 121 may be configured by the user. The more attribution that is available via the data that the user has elected to share will lend credibility to the user identity.

In one scenario, the user identity may be inactive for a prolonged period of time, and the assertion of the user identity may correspond to a new user attempting to obtain the user identity. Such a scenario may be common in a relatively congested namespace for the user identity, e.g., where the user identity corresponds to a desirable email username. When a user identity has been deemed inactive (i.e., not active for a threshold period of time), new account resources may be created for the user identity or existing account resources may be made accessible for the user identity based at least in part on social networking data.

For example, access to order history and payment instruments in the secured resources 139 may be reserved for users who can be authenticated based at least in part on a comparison of the updated social networking data 169 with the stored social networking data 145. Conversely, access to previous order history and payment instruments in the secured resources 139 may be denied based at least in part on the comparison of the updated social networking data 169 with the stored social networking data 145. Such a comparison may indicate that the user at the client 109 is the same user as that previously associated with the user identity or that the user at the client 109 is a different user.

In another scenario, the client 109 may not correspond to a stored client profile in the client profile data 159 associated with the user identity. For example, a user identity may be associated with clients 109 according to the client profile data 159. A different client 109 may log in with the correct security credential 142 for the user identity. However, because the client 109 does not correspond to the stored client profile, additional measures of authentication may be employed, for example, using social networking data as described herein.

Social networking data may be employed in other ways beyond a comparison of previous and current social networking data to facilitate authentication. For example, reputation of various people within the circle of friends 146 of the user may weigh towards confidence that the user has the identity that he or she is asserting.

Suppose that a first user identity is associated with a great reputation based on various factors in the reputational data 158, and suppose that a client 109 presents an assertion of a second user identity that identifies a social network. As a non-limiting example, the first user identity may have been registered for five years and may be associated with a lengthy history of orders. If the first user identity adds the second user identity to his or her circle of friends 146, it may be inferred that the second user identity is relatively trustworthy based at least in part on the reputation of the first user identity. If the information in the corresponding social networking profile (e.g., name, address, etc.) for the user at the client 109 in the social network matches or substantially matches stored information in the user identity data 127 for the second user identity, it may be inferred that the user at the client 109 corresponds to the second user identity. Accordingly, the identity confidence level 163 may be increased and/or the inverse identity confidence level 166 may be decreased.

When the identity confidence level 163 meets an authentication threshold, the user at the client 109 may be authenticated to have the asserted user identity. Consequently, the network page server 118 may provide access to secured resources 139 by the client 109, for those secured resources 139 that are associated with the user identity. The principles discussed herein may be applied both to authentication and identity recognition by the identity management system 121. A user identity may be recognized based at least in part on a comparison of stored social networking data 145 with updated social networking data 169. Similarly, a user identity may be recognized based at least in part on a trustworthy social networking profile presented by the client 109, where the profile contains information that maps to stored information associated with a user identity. Such a social networking profile may be deemed trustworthy based at least in part on connections to reputable friends in the circle of friends 146 for the social networking profile.

Figure 3A:
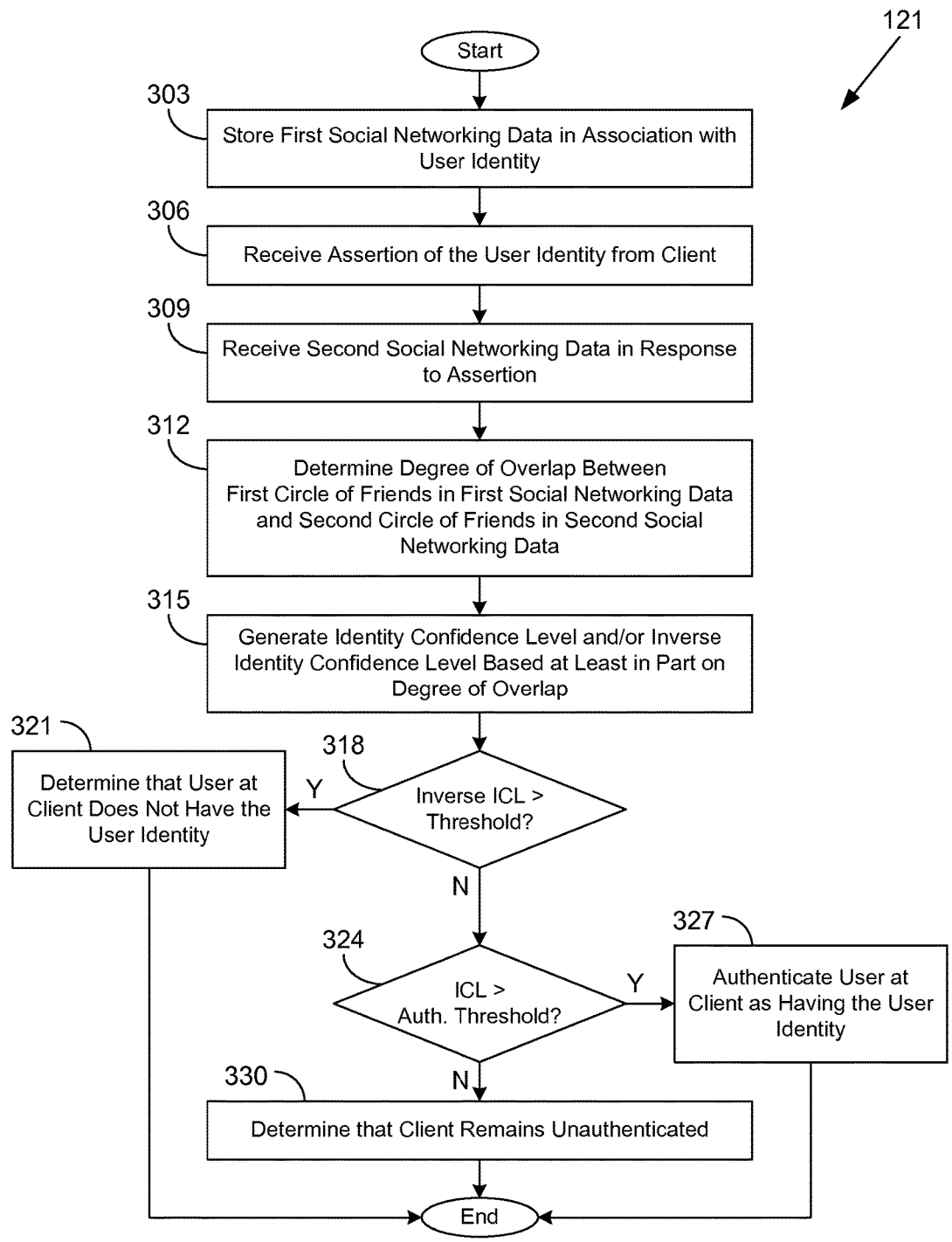
FIGS. 3A and 3B are flowcharts illustrating examples of functionality implemented as portions of identity management system executed in a computing environment in the networked environment of FIG. 1 according to various embodiments of the present disclosure.

Referring next to FIG. 3A, shown is a flowchart that provides one example of the operation of a portion of the identity management system 121 according to various embodiments. It is understood that the flowchart of FIG. 3A provides merely an example of the many different types of functional arrangements that may be employed to implement the operation of the portion of the identity management system 121 as described herein. As an alternative, the flowchart of FIG. 3A may be viewed as depicting an example of steps of a method implemented in the computing environment 103 (FIG. 1) according to one or more embodiments.

Beginning with box 303, the identity management system 121 stores first social networking data in association with a user identity in the stored social networking data 145 (FIG. 1). Such data may be obtained from a social network API 175 (FIG. 1), contact list data 148 (FIG. 1), email accounts, and/or other sources. Such data may be stored while the user identity is classified as active, or before a commencement of a predefined period of inactivity. In box 306, the identity management system 121 receives an assertion of the user identity from a user at a client 109 (FIG. 1). For example, the user may access a log-on form on a network page served up by the network page server 118 (FIG. 1) and enter a username associated with the particular user identity.

In box 309, the identity management system 121 receives second social networking data in response to the assertion. For example, as in FIG. 2, the user may be prompted to provide updated social networking data 169 (FIG. 1) to facilitate identity recognition and/or authentication. The social networking data may be received in response to the assertion meeting threshold criteria for uncertainty, e.g., when the user identity is inactive for a threshold period of time, when a password reset request is received, when characteristics of the client 109 differ from a stored client profile, when an incorrect password has been provided, and so on. In box 312, the identity management system 121 determines a degree of overlap between a first circle of friends 146 (FIG. 1) in the stored social networking data 145 and a second circle of friends 146 in the updated social networking data 169 (FIG. 1). In box 315, the identity management system 121 generates an identity confidence level 163 (FIG. 1) and/or an inverse identity confidence level 166 (FIG. 1) based at least in part on the degree of overlap.

In box 318, the identity management system 121 determines whether the inverse identity confidence level 166 meets a minimum threshold. It is noted that in some cases the inverse identity confidence level 166 may meet the minimum authentication threshold despite a correct security credential 142 (FIG. 1) being provided by the client 109. If the inverse identity confidence level 166 meets the minimum threshold, the identity management system 121 moves to box 321 and determines that the user at the client 109 does not have the asserted user identity. The client 109 may then be denied access to secured resources 139 (FIG. 1) associated with the user identity. Thereafter, the portion of the identity management system 121 ends.

If, instead, the inverse identity confidence level 166 does not meet the minimum threshold, the identity management system 121 continues from box 318 to box 324 and determines whether the identity confidence level 163 meets a minimum authentication threshold. If the identity confidence level 163 meets the minimum authentication threshold, the identity management system 121 moves from box 324 to box 327 and authenticates the user at the client 109 as having the user identity. The client 109 may be allowed access to various secured resources 139 associated with the user identity. Thereafter, the portion of the identity management system 121 ends.

If, instead, the identity confidence level 163 does not meet the minimum authentication threshold, the identity management system 121 moves from box 324 to box 330. It is noted that in some cases the identity confidence level 163 may not meet the minimum authentication threshold despite a correct security credential 142 being provided by the client 109. In box 330, the identity management system 121 determines that the client 109 remains unauthenticated. Accordingly, the identity management system 121 may deny access to some or all of the secured resources 139 associated with the user identity. In one embodiment, where the user identity is classified as being inactive after a predefined period of inactivity, a new user account having the user identity may be created for the client 109. In creating a new user account, secured resources 139 such as order history, payment instruments, etc. that were previously associated with the user identity may be disassociated from the user identity. Thereafter, the portion of the identity management system 121 ends.

Figure 3B:
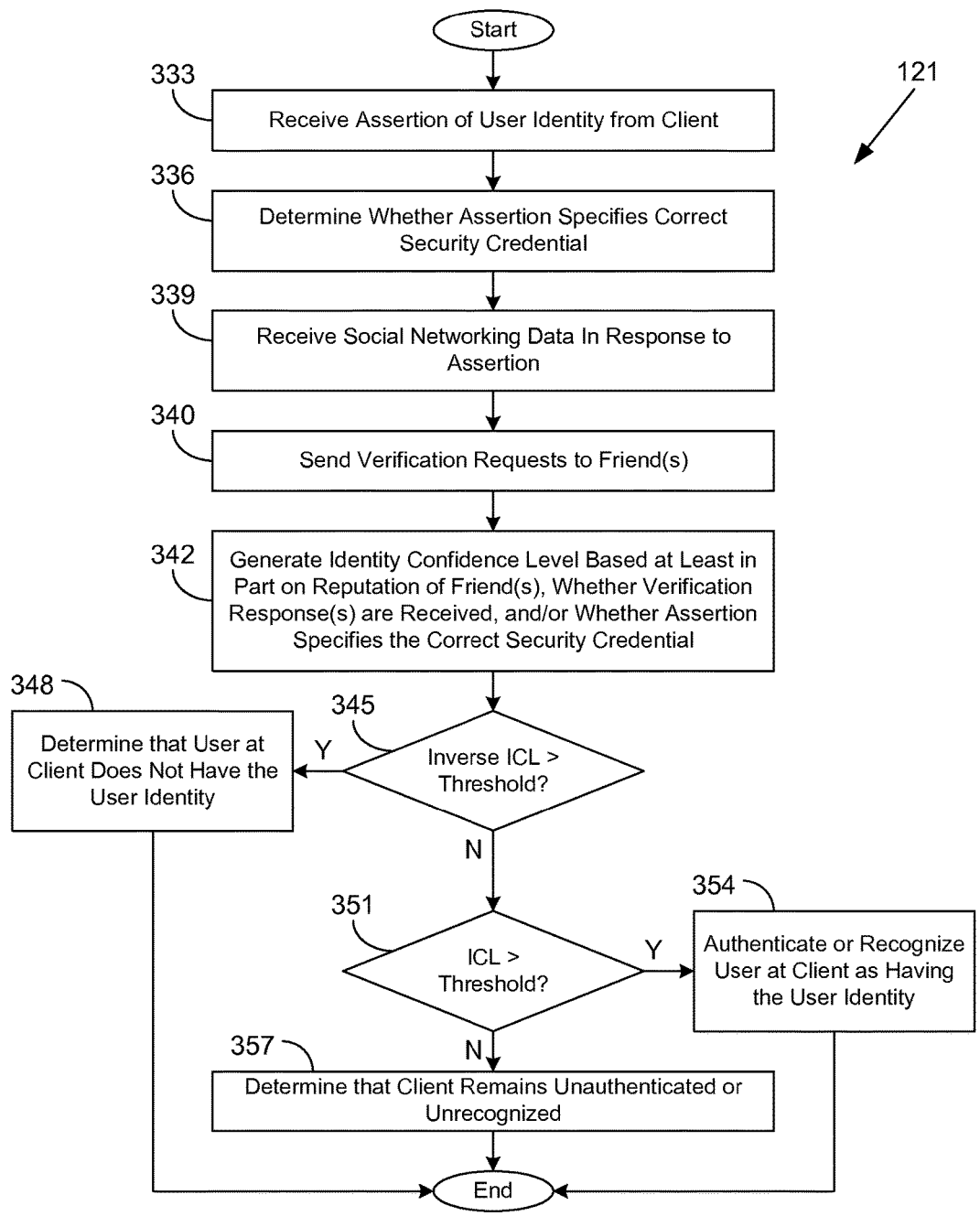

Moving on to FIG. 3B, shown is a flowchart that provides one example of the operation of another portion of the identity management system 121 according to various embodiments. It is understood that the flowchart of FIG. 3B provides merely an example of the many different types of functional arrangements that may be employed to implement the operation of the other portion of the identity management system 121 as described herein. As an alternative, the flowchart of FIG. 3B may be viewed as depicting an example of steps of a method implemented in the computing environment 103 (FIG. 1) according to one or more embodiments.

Beginning with box 333, the identity management system 121 obtains an assertion of a user identity from a client 109 (FIG. 1). In box 336, the identity management system 121 determines whether the assertion specifies a correct security credential 142 (FIG. 1). In box 339, the identity management system 121 receives social networking data in response to the assertion. For example, as in FIG. 2, the user may be prompted to provide updated social networking data 169 (FIG. 1) to facilitate identity recognition and/or authentication.

In box 340, the identity management system 121 may send a verification request to each of one or more members in the circle of friends 146 (FIG. 1) in the social networking data. The verification request asks the friends to verify or confirm some aspect of the assertion of the user identity. As a non-limiting example, the verification request may present some information provided by the user or associated with the client 109 (e.g., geolocation data associated with the client 109).

In box 342, the identity management system 121 generates an identity confidence level 163 (FIG. 1) and/or an inverse identity confidence level 166 (FIG. 1) based at least in part on the reputation of at least one member of a circle of friends 146 in the social networking data and whether the assertion specifies the correct security credential 142. The identity management system 121 may also compare the social networking profile of the user received in box 339 with stored information associated with the user identity.

Further, the identity management system 121 may or may not receive one or more verification responses from the members of the circle of friends 146 to whom a verification request was sent. If a verification response is received that indicates that the client 109 does not have the user identity, the identity confidence level 163 may be decreased and/or the inverse identity confidence level 166 may be increased. If a verification response is received that indicates that the client 109 does have the user identity, the identity confidence level 163 may be increased and/or the inverse identity confidence level 166 may be decreased. If no verification response is received, the identity confidence level 163 and/or the inverse identity confidence level 166 may be unaffected, or the identity confidence level 163 may be decreased and/or the inverse identity confidence level 166 may be increased. The amount of the change to the identity confidence level 163 and/or the inverse identity confidence level 166 may depend at least in part on the respective reputation of the friend to whom the verification request was sent.

Continuing on, as a non-limiting example, if relatively many members of the circle of friends 146 are determined to be known fraudsters from the reputational data 158 (FIG. 1), the identity confidence level 163 may be determined to be relatively lower and/or the inverse identity confidence level 166 may be determined to be relatively higher. As another non-limiting example, if relatively many members of the circle of friends 146 are determined to have a premier paid membership status from the reputational data 158, the identity confidence level 163 may be determined to be relatively higher and/or the inverse identity confidence level 166 may be determined to be relatively lower. It is noted that the identity management system 121 may take into account many other factors in generating the identity confidence level 163 and/or the inverse identity confidence level 166. For example, a client 109 that is determined to be in a country or region with high levels of fraud may have a relatively higher inverse identity confidence level 166 and/or a relatively lower identity confidence level 163.

In box 345, the identity management system 121 determines whether the inverse identity confidence level 166 meets a minimum threshold. If the inverse identity confidence level 166 meets the minimum threshold, the identity management system 121 moves to box 348 and determines that the user at the client 109 does not have the asserted user identity. The client 109 may then be denied access to secured resources 139 (FIG. 1) associated with the user identity. Thereafter, the portion of the identity management system 121 ends.

If, instead, the inverse identity confidence level 166 does not meet the minimum threshold, the identity management system 121 continues from box 345 to box 351 and determines whether the identity confidence level 163 meets a minimum threshold. Such a threshold may be for authentication or recognition. If the identity confidence level 163 meets the minimum threshold, the identity management system 121 moves from box 351 to box 354 and authenticates or recognizes the user at the client 109 as having the user identity. The client 109 may be allowed access to various secured resources 139 associated with the user identity. It is noted that access to other secured resources 139 may depend on the identity confidence level 163 meeting a greater threshold than the minimum threshold. Thereafter, the portion of the identity management system 121 ends.

If, instead, the identity confidence level 163 does not meet the minimum authentication threshold, the identity management system 121 moves from box 351 to box 357. It is noted that in some cases the identity confidence level 163 may not meet the minimum threshold despite a correct security credential 142 being provided by the client 109. In box 357, the identity management system 121 determines that the client 109 remains unauthenticated or unrecognized. Accordingly, the identity management system 121 may deny access to some or all of the secured resources 139 associated with the user identity. Thereafter, the portion of the identity management system 121 ends.

Figure 4:
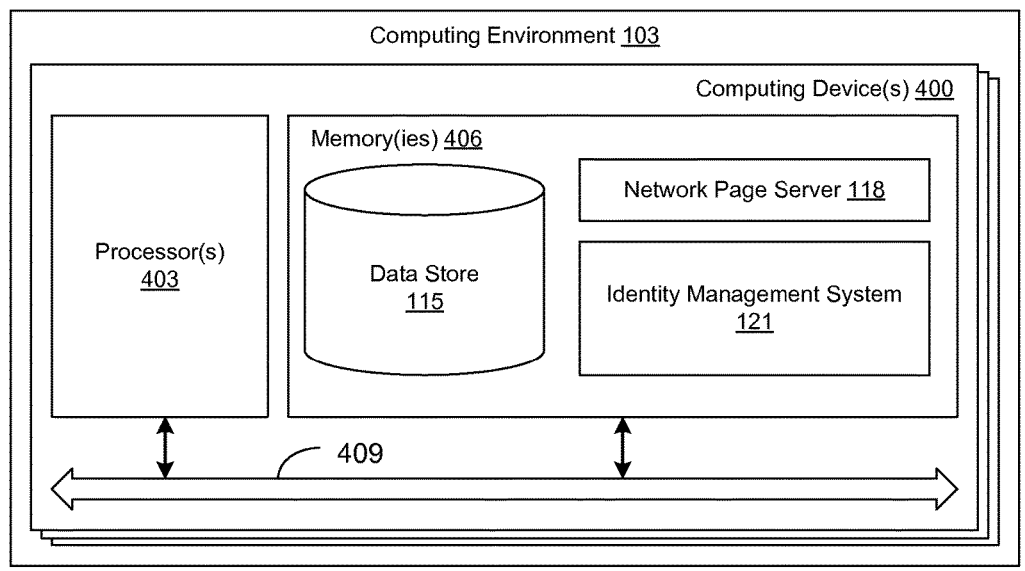
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network page server 118, the identity management system 121, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network page server 118, the identity management system 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the identity management system 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 118 and the identity management system 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    at least one application executable in the at least one computing device, wherein when executed the at least one application causes the at least one computing device to at least:
        store first social networking data in association with a user identity, the first social networking data identifying a first circle of friends;
        receive an assertion of the user identity from a client computing device associated with a user after the first social networking data is stored;
        receive second social networking data that describes a second circle of friends in response to receiving the assertion of the user identity;
        determine a degree of overlap between the first circle of friends and the second circle of friends;
        send a verification request to the at least one member of the first circle of friends, the verification request soliciting a verification relative to the assertion of the user identity; and
        approve or deny access by the client computing device to a secured resource associated with the user identity based at least in part on whether the degree of overlap between the first circle of friends and the second circle of friends meets a predetermined threshold and whether a verification response to the verification request is received from the at least one member of the first circle of friends.

2. The system of claim 1, wherein when executed the at least one application further causes the at least one computing device to at least:
    cause a user interface to be rendered via the client computing device in response to receiving the assertion of the user identity, the user interface eliciting social network account information;

receive the social network account information from the client computing device; and request the second social networking data using the social network account information.

3. The system of claim 1, wherein when executed the at least one application further causes the at least one computing device to at least:

cause a user interface to be rendered via the client computing device in response to receiving the assertion of the user identity, the user interface eliciting the second social networking data; and wherein the second social networking data is received from the client computing device.

4. The system of claim 1, wherein when executed the at least one application further causes the at least one computing device to at least:

determine whether the user identity belongs to the user at the client computing device based at least in part on the degree of overlap between the first circle of friends and the second circle of friends; and wherein access to the secured resource by the client computing device is approved when a determination that the user identity belongs to the user meets a threshold of confidence.

5. The system of claim 1, wherein when executed the at least one application further causes the at least one computing device to at least:

determine whether the user identity does not belong to the user at the client computing device based at least in part on the degree of overlap between the first circle of friends and the second circle of friends; and wherein access to the secured resource by the client computing device is denied when a determination that the user identity does not belong to the user meets a threshold of confidence.

6. The system of claim 1, wherein access to the secured resource by the client computing device is approved or denied further based at least in part on a reputation of at least one member of the second circle of friends.

7. The system of claim 1, wherein access to the secured resource by the client computing device is approved or denied further based at least in part on whether a single payment instrument has been used to pay for a first shipment to at least one member of the first circle of friends and a second shipment to at least one member of the second circle of friends.

8. The system of claim 1, wherein the verification request presents geolocation data associated with the client computing device.

9. The system of claim 1, wherein the verification request presents information provided by the user at the client computing device.

10. A method, comprising:

storing, via at least one of one or more computing devices, first social networking data in association with a user identity, the first social networking data identifying a first circle of friends;

receiving, via at least one of the one or more computing devices, an assertion of the user identity from a client computing device associated with a user after the first social networking data is stored;

receiving, via at least one of the one or more computing devices, second social networking data that describes a second circle of friends in response to receiving the assertion of the user identity;

determining, via at least one of the one or more computing devices, a degree of overlap between the first circle of friends and the second circle of friends;

sending, via at least one of the one or more computing devices, a verification request to the at least one member of the first circle of friends, the verification request soliciting a verification relative to the assertion of the user identity; and approving or denying, via at least one of the one or more computing devices, access by the client computing device to a secured resource associated with the user identity based at least in part on whether the degree of overlap between the first circle of friends and the second circle of friends meets a predetermined threshold and whether a verification response to the verification request is received from the at least one member of the first circle of friends.

11. The method of claim 10, further comprising:

causing, via at least one of the one or more computing devices, a user interface to be rendered via the client computing device in response to receiving the assertion of the user identity, the user interface eliciting social network account information;

receiving, via at least one of the one or more computing devices, the social network account information from the client computing device; and requesting, via at least one of the one or more computing devices, the second social networking data using the social network account information.

12. The method of claim 10, further comprising:

causing, via at least one of the one or more computing devices, a user interface to be rendered via the client computing device in response to receiving the assertion of the user identity, the user interface eliciting the second social networking data; and wherein the second social networking data is received from the client computing device.

13. The method of claim 10, further comprising:

determining, via at least one of the one or more computing devices, whether the user identity belongs to the user at the client computing device based at least in part on the degree of overlap between the first circle of friends and the second circle of friends; and wherein access to the secured resource by the client computing device is approved when a determination that the user identity belongs to the user meets a threshold of confidence.

14. The method of claim 10, further comprising:

determining, via at least one of the one or more computing devices, whether the user identity does not belong to the user at the client computing device based at least in part on the degree of overlap between the first circle of friends and the second circle of friends; and wherein access to the secured resource by the client computing device is denied when a determination that the user identity does not belong to the user meets a threshold of confidence.

15. The method of claim 10, wherein access to the secured resource by the client computing device is approved or denied further based at least in part on a reputation of at least one member of the second circle of friends.

16. The method of claim 10, wherein access to the secured resource by the client computing device is approved or denied further based at least in part on whether a single payment instrument has been used to pay for a first shipment to at least one member of the first circle of friends and a second shipment to at least one member of the second circle of friends.

17. A non-transitory computer-readable medium embodying at least one program executable in at least one computing device, wherein when executed the at least one program causes the at least one computing device to at least:
   store first social networking data in association with a user identity, the first social networking data identifying a first circle of friends;
   receive an assertion of the user identity from a client computing device associated with a user after the first social networking data is stored;
   receive second social networking data that describes a second circle of friends in response to receiving the assertion of the user identity;
   determine a degree of overlap between the first circle of friends and the second circle of friends;
   send a verification request to the at least one member of the first circle of friends, the verification request soliciting a verification relative to the assertion of the user identity; and
   approve or deny access by the client computing device to a secured resource associated with the user identity based at least in part on whether the degree of overlap between the first circle of friends and the second circle of friends meets a predetermined threshold and whether a verification response to the verification request is received from the at least one member of the first circle of friends.

18. The non-transitory computer-readable medium of claim 17, wherein when executed the at least one program further causes the at least one computing device to at least:
   cause a user interface to be rendered via the client computing device in response to receiving the assertion of the user identity, the user interface eliciting social network account information;
   receive the social network account information from the client computing device; and
   request the second social networking data using the social network account information.

19. The non-transitory computer-readable medium of claim 17, wherein when executed the at least one program further causes the at least one computing device to at least:
   cause a user interface to be rendered via the client computing device in response to receiving the assertion of the user identity, the user interface eliciting the second social networking data; and
   wherein the second social networking data is received from the client computing device.

20. The non-transitory computer-readable medium of claim 17, wherein when executed the at least one program further causes the at least one computing device to at least:
   determine whether the user identity belongs to the user at the client computing device based at least in part on the degree of overlap between the first circle of friends and the second circle of friends; and
   wherein access to the secured resource by the client computing device is approved when a determination that the user identity belongs to the user meets a threshold of confidence.

* * * * *